(12) United States Patent
Sonobe et al.

(10) Patent No.: US 8,603,650 B2
(45) Date of Patent: Dec. 10, 2013

(54) PERPENDICULAR MAGNETIC RECORDING DISK AND MANUFACTURING METHOD THEREOF

(75) Inventors: Yoshiaki Sonobe, Tokyo (JP); Teiichiro Umezawa, Tokyo (JP); Chikara Takasu, Tokyo (JP)

(73) Assignee: WD Media (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 10/576,755

(22) PCT Filed: Jun. 29, 2005

(86) PCT No.: PCT/JP2005/011926
§ 371 (c)(1),
(2), (4) Date: Aug. 9, 2006

(87) PCT Pub. No.: WO2006/003922
PCT Pub. Date: Jan. 12, 2006

(65) Prior Publication Data
US 2007/0148499 A1    Jun. 28, 2007

(30) Foreign Application Priority Data
Jun. 30, 2004    (JP) .................................. 2004-194175

(51) Int. Cl.
*G11B 5/673*    (2006.01)

(52) U.S. Cl.
USPC ........ 428/829; 428/828; 428/828.1; 428/830; 428/836.2; 428/836.3; 427/131

(58) Field of Classification Search
USPC ............................................... 428/827–829
See application file for complete search history.

(56) References Cited

U.S. PATENT DOCUMENTS

| | | | |
|---|---|---|---|
| 6,468,670 B1 * | 10/2002 | Ikeda et al. | 428/611 |
| 6,562,481 B1 * | 5/2003 | Kaitsu et al. | 428/611 |
| 6,777,112 B1 * | 8/2004 | Girt et al. | 428/828 |

(Continued)

FOREIGN PATENT DOCUMENTS

| | | |
|---|---|---|
| JP | 2002-092865 A | 3/2002 |
| JP | 2003-272121 A | 9/2003 |

(Continued)

OTHER PUBLICATIONS

Y. Sonobe, et al., "Thermally Stable CGC Perpendicular Recording Media With Pt-Rich CoPtCr and Thin Pt Layers", IEEE Transactions on Magnetics, vol. 38, No. 5, Sep. 2002, pp. 2006-2011.

(Continued)

*Primary Examiner* — Kevin Bernatz

(57) ABSTRACT

A magnetic disk 10 for use in perpendicular magnetic recording has at least a magnetic recording layer on a substrate 1. The magnetic recording layer is composed of a ferromagnetic layer 5 of a granular structure containing silicon (Si) or an oxide of silicon (Si) between crystal grains containing cobalt (Co), a stacked layer 7 having a first layer containing cobalt (Co) or a Co alloy and a second layer containing palladium (Pd) or platinum (Pt), and a spacer layer 6 interposed between the ferromagnetic layer 5 and the stacked layer 7. After forming the ferromagnetic layer 5 on the substrate 1 by sputtering in an argon gas atmosphere, the stacked layer 7 is formed by sputtering in the argon gas atmosphere at a gas pressure lower than that used when forming the ferromagnetic layer 5.

10 Claims, 5 Drawing Sheets

(56) References Cited

U.S. PATENT DOCUMENTS

| | | | |
|---|---|---|---|
| 6,830,824 B2* | 12/2004 | Kikitsu et al. | 428/828.1 |
| 6,881,497 B2* | 4/2005 | Coffey et al. | 428/828.1 |
| 7,081,268 B2* | 7/2006 | Chang et al. | 427/128 |
| 7,132,176 B2* | 11/2006 | Iwasaki et al. | 428/829 |
| 7,235,314 B2 | 6/2007 | Chen et al. | 428/831 |
| 7,311,983 B2* | 12/2007 | Watanabe et al. | 428/829 |
| 7,470,474 B2* | 12/2008 | Sakawaki et al. | 428/829 |
| 2001/0051287 A1 | 12/2001 | Kikitsu et al. | |
| 2002/0012816 A1 | 1/2002 | Shimizu et al. | |
| 2003/0017364 A1* | 1/2003 | Kikitsu et al. | 428/693 |
| 2003/0064249 A1* | 4/2003 | Uwazumi et al. | 428/694 BA |
| 2003/0219627 A1 | 11/2003 | Osaka et al. | |
| 2004/0058197 A1* | 3/2004 | Nakamura et al. | 428/694 MM |
| 2004/0110034 A1 | 6/2004 | Kawada | |
| 2006/0134467 A1* | 6/2006 | Hirayama et al. | 428/828.1 |

FOREIGN PATENT DOCUMENTS

| | | | | |
|---|---|---|---|---|
| JP | 2003272121 A | * | 9/2003 | G11B 5/66 |
| JP | 2004-192711 A | | 7/2004 | |
| JP | 2004-310910 A | | 11/2004 | |
| WO | 2004090874 | | 10/2004 | |

OTHER PUBLICATIONS

T. Oikawa, et al., "Microstructure and Magnetic Properties of CoPtCr-SiO$_2$ Perpendicular Recording Media", IEEE Transactions on Magnetics vol. 38, No. 5, Sep. 2002, pp. 1976-1978.

Y. Sonobe, et al., "Thermal Stability and SNR of Coupled Granular/Continuous Media", IEEE Transactions on Magnetics vol. 37, No. 4, Jul. 2001, pp. 1667-1670.

H. Muraoka, "Migration Pathway to Next Generation Perpendicular Magnetic Recording", Article for the 135$^{th}$ Topical Symposium of the Magnetic Society of Japan, Mar. 12, 2004.

S. Takenoirj, et al., "Development and Issue of CoPtCr-SiO$_2$ Perpendicular Recording Media", Article for the 135$^{th}$ Topical Symposium of the Magnetic Society of Japan, Mar. 12, 2004.

European Office Action dated Jul. 25, 2008.

EP Search Report dated Sep. 26, 2007 from EP Patent Application No. 05765413.9, 3 pages.

Office Action dated Dec. 21, 2010 from CN Patent Application No. 201010002057.7, 7 pages.

Office Action dated Mar. 21, 2012 from CN Patent Application No. 201010002057.7, 9 pages.

Office Action dated Aug. 31, 2012 from CN Patent Application No. 201010002057.7, 9 pages.

Examination Report for Singapore Patent Application No. 200904258-1 dated Jun. 29, 2012, 11 pages.

Office Action dated Nov. 30, 2010 in Japanese Patent Application No. 2006-528738, 6 pages.

Office Action dated Jan. 3, 2008 from EP Patent Application No. 05765413.9, 4 pages.

Office Action dated Jul. 25, 2008 from EP Patent Application No. 05765413.9, 3 pages.

Office Action dated Feb. 17, 2009 from EP Patent Application No. 05765413.9, 2 pages.

Office Action dated Jul. 9, 2009 from EP Patent Application No. 05765413.9, 2 pages.

Office Action dated Jan. 19, 2010 from EP Patent Application No. 05765413.9, 2 pages.

Office Action dated Jun. 15, 2010 from EP Patent Application No. 05765413.9, 4 pages.

Office Action dated Oct. 1, 2011 from EP Patent Application No. 05765413.9, 4 pages.

Office Action dated Jul. 28, 2011 from EP Patent Application No. 05765413.9, 3 pages.

Office Action dated Dec. 15, 2011 from EP Patent Application No. 05765413.9, 4 pages.

Office Action dated Apr. 30, 2010 from Philippines Application No. 12006502611, 1 page.

* cited by examiner (a) COMPARATIVE EXAMPLE 1

(b) EXAMPLE 3

US 8,603,650 B2

PERPENDICULAR MAGNETIC RECORDING DISK AND MANUFACTURING METHOD THEREOF

TECHNICAL FIELD

This invention relates to a perpendicular magnetic recording disk adapted to be mounted in a perpendicular magnetic recording type HDD (hard disk drive) or the like.

BACKGROUND ART

Various information recording techniques have been developed following the increase in volume of information processing in recent years. Particularly, the areal density of a HDD (hard disk drive) using the magnetic recording technique has been increasing at an annual rate of about 100%. Recently, the information recording capacity exceeding 60 GB has been required per 2.5-inch magnetic disk adapted for use in a HDD or the like. In order to satisfy such a requirement, it is necessary to realize an information recording density exceeding 100 Gbits/inch$^2$. In order to achieve the high recording density in the magnetic disk for use in the HDD or the like, it is necessary to reduce the size of magnetic crystal grains forming a magnetic recording layer serving to record information signals, and further, to reduce the thickness of the layer. However, in the case of the conventionally commercialized magnetic disk of the in-plane magnetic recording type (also called the longitudinal magnetic recording type or the horizontal magnetic recording type), as a result of the size reduction of the magnetic crystal grains, there has arisen a thermal fluctuation phenomenon where thermal stability of recording signals is degraded due to superparamagnetism to thereby cause loss of the recording signals, which has thus become an impeding factor for the increase in recording density of the magnetic disk.

In order to solve this impeding factor, the magnetic disk of the perpendicular magnetic recording type has been proposed in recent years. In the case of the perpendicular magnetic recording type, as different from the case of the in-plane magnetic recording type, the easy magnetization axis of a magnetic recording layer is adjusted so as to be oriented in a direction perpendicular to the surface of a substrate. As compared with the in-plane magnetic recording type, the perpendicular magnetic recording type can suppress the thermal fluctuation phenomenon and thus is suitable for increasing the recording density. For example, Unexamined Patent Publication No. 2002-92865 (Patent Document 1) discloses a technique about a perpendicular magnetic recording medium having an underlayer, a Co-based perpendicular magnetic recording layer, and a protective layer that are formed on a substrate in the order named. Further, U.S. Pat. No. 6,468,670 Specification (Patent Document 2) discloses a perpendicular magnetic recording medium having a structure where an exchange-coupled artificial lattice film continuous layer (exchange-coupled layer) is adhered to a granular recording layer.

Patent Document 1:
Unexamined Patent Publication No. 2002-92865
Patent Document 2:
U.S. Pat. No. 6,468,670 Specification

DISCLOSURE OF THE INVENTION

Problem to be Solved by the Invention

The recording density of a magnetic disk is improved mainly by reducing noise in a magnetization transition region of a magnetic recording layer. For the noise reduction, it is necessary to improve the crystal orientation of the magnetic recording layer or reduce the crystal grain size and the magnitude of magnetic interaction. That is, in order to increase the recording density of the medium, it is desirable to equalize and reduce the crystal grain size of the magnetic recording layer and, further, to provide a segregated state where individual magnetic crystal grains are magnetically segregated and, for that, it is necessary to properly control a fine structure of the magnetic recording layer. In the meantime, the Co-based perpendicular magnetic recording layer disclosed in Patent Document 1, particularly a CoPt-based perpendicular magnetic recording layer, has a high coercive force Hc and can cause a magnetization reversal producing magnetic field Hn to be a small value less than zero and, therefore, resistance against thermal fluctuation can be improved and a high S/N ratio can be achieved, which is thus preferable. Further, by causing an element such as Cr to be contained in such a perpendicular magnetic recording layer, Cr can be segregated at grain boundary portions of the magnetic crystal grains to block exchange interaction between the magnetic crystal grains, thereby contributing to increasing the recording density.

Further, by adding an oxide such as $SiO_2$ or O to the CoPt-based perpendicular magnetic recording layer, it is possible to form an excellent segregated structure without impeding epitaxial growth of CoPt. That is, the oxide such as $SiO_2$ or O is segregated at the grain boundaries to reduce the magnetic interaction between the crystal grains of the magnetic recording layer. Further, by the addition of the oxide such as $SiO_2$ or O, the crystal grain size can be reduced. The crystal grain size and the magnitude of the magnetic interaction are affected by the thickness of $SiO_2$ layers segregated at the grain boundaries or the crystal grain size of the underlayer. By increasing the amount of $SiO_2$ added to the magnetic recording layer, the size reduction and the magnetic segregation proceed so that the S/N ratio in high density recording is improved. This causes a maximum anisotropy energy Ku to be approximately twice higher as compared with a conventional medium added with no $SiO_2$. It has been found that the problem of the S/N ratio or the thermal stability does not arise up to 200 to 400 Gbit/inch$^2$ in the case of such a magnetic recording disk.

However, it has been found that when aiming at a medium adaptable to 400 Gbit/inch$^2$ or more, it is difficult to produce the medium excellent in thermal stability or recording properties only by adding the oxide such as $SiO_2$ or O. That is, it has been found that when, for example, the amount of $SiO_2$ is increased to 6 at % or more, degradation occurs in coercive force Hc and perpendicular magnetic anisotropy (see FIG. 6). FIG. 6 shows a relationship between a coercive force Hc and a SNR when increasing the amount of $SiO_2$. According to FIG. 6, the Hc decreases as the amount of $SiO_2$ increases. It is considered that the thermal stability degrades and the DC noise increases due to reduction in coercive force Hc. On the other hand, the present inventors have found that as the amount of $SiO_2$ increases, the SNR (SN Ratio: hereinafter also referred to as SN) becomes better due to size reduction (see FIG. 6). In FIG. 6, the axis of ordinates showing the SNR graduates differences from a reference value properly defined. According to the relationship between $SiO_2$ and SN, it is understood that when $SiO_2$ is added in an amount of 6 at % or more, the SN is rapidly improved. Therefore, a medium is desirable that maintains the thermal stability and, further, is added with $SiO_2$ in an amount of 6 at % or more where the SN becomes excellent.

In response to such a request, it may be considered to use a method of increasing the amount of Pt in the magnetic recording layer to thereby increase the anisotropy. However, it is known that there arises a new problem that sufficient recording cannot be achieved following the increase in anisotropy. Particularly, in a recording density range of 100 Gbit/inch$^2$ or more, the recording capability of a magnetic head itself is extremely lowered following track narrowing and, therefore, it is necessary to improve the recording capability on the magnetic recording layer side, which arises as a new problem.

This invention solves such conventional and new problems and has an object to provide a perpendicular magnetic recording disk that can contribute to increasing the recording density by improving the S/N ratio in high density recording without causing an increase in DC noise, degradation in thermal stability, and degradation in recording capability, and a method of manufacturing such a disk.

Means for Solving the Problem

For solving the foregoing problems, this invention has the following structures.

(Structure 1) A perpendicular magnetic recording disk for use in perpendicular magnetic recording, the perpendicular magnetic recording disk characterized by comprising a substrate, a ferromagnetic layer formed on the substrate, having a granular structure, and containing an oxide, silicon (Si), or an oxide of silicon (Si), and a stacked layer formed on the ferromagnetic layer and having a first layer containing cobalt (Co) or a Co alloy and a second layer containing palladium (Pd) or platinum (Pt).

(Structure 2) A perpendicular magnetic recording disk according to Structure 1, characterized in that the ferromagnetic layer has crystal gains mainly made of cobalt (Co) and grain boundary portions mainly made of the oxide, the silicon (Si), or the oxide of silicon (Si).

(Structure 3) A perpendicular magnetic recording disk according to Structure 1 or 2, characterized in that the content of the silicon (Si) in the ferromagnetic layer is 6 at % or more.

(Structure 4) A perpendicular magnetic recording disk according to Structure 1 or 2, characterized in that the content of the silicon (Si) in the ferromagnetic layer is 8 at % to 15 at %.

(Structure 5) A perpendicular magnetic recording disk according to any of Structures 1 to 4, characterized in that a spacer layer is provided between the ferromagnetic layer and the stacked layer.

(Structure 6) A method of manufacturing a perpendicular magnetic recording disk for use in perpendicular magnetic recording and having at least a magnetic recording layer on a substrate, the method characterized by, in a step of forming the magnetic recording layer comprising, on the substrate, a ferromagnetic layer of a granular structure containing silicon (Si) or an oxide of silicon (Si) between crystal grains containing cobalt (Co) and a stacked layer having a first layer containing Co or a Co alloy and a second layer containing palladium (Pd) or platinum (Pt), forming the ferromagnetic layer on the substrate by sputtering in an argon gas atmosphere and then forming the stacked layer by sputtering in an argon gas atmosphere at a gas pressure lower than a gas pressure used when forming the ferromagnetic layer.

As recited in Structure 1, in the perpendicular magnetic recording disk of this invention, the magnetic recording layer includes at least the ferromagnetic layer formed on the substrate, having the granular structure, and containing an oxide, silicon (Si), or an oxide of silicon (Si), and the stacked layer formed on the ferromagnetic layer and having the first layer containing Co or a Co alloy and the second layer containing Pd or Pt.

As a Co-based magnetic material forming the ferromagnetic layer, particularly a CoPt-based or CoPtCr-based magnetic material is preferable. The CoPt-based or CoPtCr-based magnetic material has a high coercive force Hc and can cause a magnetization reversal producing magnetic field Hn to be a small value less than zero and, therefore, resistance against thermal fluctuation can be improved and a high S/N ratio can be achieved, which is thus preferable. By causing an element such as silicon (Si) or an oxide thereof to be contained in the CoPt-based or CoPtCr-based magnetic material, Si or the like or the oxide thereof can be segregated at grain boundary portions of the magnetic crystal grains to reduce the exchange interaction between the magnetic crystal grains, thereby reducing the medium noise and improving the S/N ratio in high density recording. Si may be added to the CoPt-based or CoPtCr-based magnetic material not only alone, but also as an oxide or Si oxide such as $SiO_2$. When Si is added as the Si oxide such as $SiO_2$, the Si oxide is segregated at the grain boundaries to reduce the magnetic interaction between the crystal grains of the magnetic recording layer, thereby reducing the medium noise and improving the S/N ratio in high density recording.

By adding Si or the Si oxide to the CoPt-based or CoPtCr-based magnetic material, the crystal grain size can be reduced. However, there arises the problem that when the adding amount of Si or the Si oxide is large, the crystal grains become too small, so that the thermal fluctuation increases. Therefore, for example, the adding amount of the Si oxide is suppressed to 5 at % or less conventionally. Accordingly, there is inevitably a limit to the increase in recording density. In contrast, in this invention, even if the adding amount of Si or the Si oxide is increased, the degradation of thermal stability can be prevented by the ferromagnetic layer containing the oxide, silicon (Si), or the silicon (Si) oxide and the stacked layer formed on the ferromagnetic layer and having the first layer containing Co or the Co alloy and the second layer containing Pd or Pt, thereby contributing to increasing the recording density without causing the degradation of thermal stability.

As recited in Structure 2, in this invention, the ferromagnetic layer has the crystal gains mainly made of Co and the grain boundary portions mainly made of the oxide, silicon (Si), or the silicon (Si) oxide. It becomes possible to magnetically shield between the size-reduced crystal grains.

As recited in Structure 3 or 4, the content of silicon (Si) in the ferromagnetic layer is 6 at % or more, and more preferably 8 at % to 15 at %. When the content of silicon (Si) in the ferromagnetic layer is 6 at % or more, the SN is rapidly improved. However, 8 at % to 15 at % is preferable for the following reason. When the content is less than 8 at %, the effect of reducing the medium noise is small and, further, the S/N ratio in high density recording cannot be improved sufficiently. On the other hand, when the content is greater than 15 at %, the perpendicular magnetic anisotropy starts to degrade and, following it, there occurs the degradation of thermal stability in high density recording or the increase in DC noise. For the same reason, 10 to 15 at % is particularly preferable and 12 to 15 at % is further preferable. In this invention, the ferromagnetic layer has the granular structure containing Si or the oxide thereof between the magnetic crystal grains containing Co. The thickness of the ferromagnetic layer is preferably 20 nm or less. Desirably, the range of 8 to 16 nm is preferable.

The stacked layer is adjacent to the ferromagnetic layer or through the spacer layer therebetween. The stacked layer is magnetically coupled to the ferromagnetic layer and functions to align the easy magnetization axes of the respective layers substantially in the same direction. In the stacked layer, crystal grains are magnetically coupled to each other. In terms of the ferromagnetic layer made of the Co-based magnetic material, the stacked layer is preferably made of alternate-layered films of cobalt (Co) or an alloy thereof and palladium (Pd) or alternate-layered films of cobalt (Co) or an alloy thereof and platinum (Pt). Since the alternate-layered films made of such materials have large magnetic Ku, the domain wall width in the stacked layer can be reduced. The thickness thereof is preferably 1 to 8 nm. Desirably, 2 to 5 nm is preferable. Even when use is made of CoCrPt containing a large amount of Pt, CoPt, CoPd, FePt, $CoPt_3$, or $CoPd_3$ as a material of the stacked layer instead of the foregoing multi-layer film, the similar effect can be obtained.

Further, in order to achieve suitable perpendicular magnetic recording properties based on exchange coupling, it is necessary to set a proper thickness ratio between the ferromagnetic layer and the stacked layer such that when the thickness of the ferromagnetic layer is increased, the thickness of the stacked layer is increased, or when the thickness of the ferromagnetic layer is reduced, the thickness of the stacked layer is reduced. Given that the thickness of the ferromagnetic layer is A and the thickness of the exchange energy control layer is B, A/B (ratio of A to B) is preferably in the range of 2 to 5. Desirably, 3 to 4 is preferable. Further, as recited in Structure 5, the spacer layer is preferably provided between the ferromagnetic layer and the stacked layer. By providing the spacer layer, the exchange coupling between the ferromagnetic layer and the stacked layer can be suitably controlled. As the spacer layer, use is preferably made of, for example, a Pd layer or a Pt layer depending on the stacked layer. When the Pd layer is used in the stacked layer, the Pd layer is also used as the spacer layer. This is because it is economically preferable to use the same composition in terms of the condition of a manufacturing apparatus. The thickness of the spacer layer is preferably 2 nm or less and desirably in the range of 0.5 to 1.5 nm.

The ferromagnetic layer and the stacked layer are disposed adjacent to each other or through the spacer layer interposed therebetween and, in view of HDI (Head Disk Interface), it is preferable to dispose the stacked layer above the ferromagnetic layer as seen from the substrate. The ferromagnetic layer is not limited to the single layer, but may be composed of a plurality of layers. In this case, Co-based magnetic layers containing Si or the Si oxide may be combined with each other, or a Co-based magnetic layer containing Si or the Si oxide and a Co-based magnetic layer containing no Si or Si oxide may be combined with each other. Note that it is preferable to dispose the Co-based magnetic layer containing Si or the Si oxide on the side adjacent to the stacked layer. The perpendicular magnetic recording layer of this invention is preferably formed by the sputtering method. Particularly, the DC magnetron sputtering method is preferable because uniform film formation is enabled.

As recited in Structure 6, when forming the perpendicular magnetic recording layer composed of the ferromagnetic layer and the stacked layer on the substrate, it is desirable to form the ferromagnetic layer on the substrate by sputtering in the argon gas atmosphere and then to form the stacked layer by sputtering in the argon gas atmosphere at the gas pressure lower than that used when forming the ferromagnetic layer. It is necessary that the ferromagnetic layer be formed at high gas pressure. The reason is that the magnetic grain size in the ferromagnetic layer can be diminished in order to reduce the medium noise and, further, Si or the Si oxide can be segregated in a uniform thickness between the magnetic crystal grains containing Co at the grain boundaries. In contrast, it is necessary that the stacked layer be formed at low gas pressure. The reason is that the stacked layer is required to be magnetically uniform for fixing domain walls (magnetization transition points) anywhere by pinning force from the magnetic grains of the ferromagnetic layer, i.e. for allowing the domain walls to freely move unless there is the ferromagnetic layer adjacent to the stacked layer, and it is preferable to form the stacked layer at low gas pressure for that purpose. In this case, the stacked layer is preferably formed by sputtering at a gas temperature, for example, in the range of 1 to 10 mTorr. On the other hand, the ferromagnetic layer is preferably formed by sputtering at a gas temperature of 30 mTorr or more.

The perpendicular magnetic recording disk of this invention has at least the foregoing perpendicular magnetic recording layer on the substrate and preferably has various functional layers in addition thereto. In this invention, a soft magnetic layer may be provided on the substrate for suitably adjusting a magnetic circuit of the perpendicular magnetic recording layer. In this invention, the soft magnetic layer is not particularly limited as long as it is made of a magnetic body that exhibits soft magnetic properties and, for example, preferably has as a magnetic property a coercive force of 0.01 to 80 oersteds and more preferably 0.01 to 50 oersteds. Further, it preferably has as a magnetic property a saturation magnetic flux density (Bs) of 500 emu/cc to 1920 emu/cc. As a material of the soft magnetic layer, there can be cited an Fe-based material, a Co-based material, or the like. For example, use can be made of an Fe-based soft magnetic material such as FeTaC-based alloy, FeTaN-based alloy, FeNi-based alloy, FeCoB-based alloy, or FeCo-based alloy, a Co-based soft magnetic material such as CoTaZr-based alloy or CoNbZr-based alloy, an FeCo-based alloy soft magnetic material, or the like.

In this invention, the thickness of the soft magnetic layer is preferably 30 nm to 1000 nm and desirably 50 nm to 200 nm. When it is less than 30 nm, there is a case where it becomes difficult to form a suitable magnetic circuit between magnetic head—perpendicular magnetic recording layer—soft magnetic layer, while, when it exceeds 1000 nm, there is a case where the surface roughness increases. Further, when it exceeds 1000 nm, there is a case where the sputtering film formation becomes difficult. In this invention, a nonmagnetic underlayer is preferably provided on the substrate for orienting the crystals of the perpendicular magnetic recording layer in a direction perpendicular to the substrate surface. A Ti-based alloy is preferable as a material of the nonmagnetic underlayer. The Ti-based alloy well serves to control crystal axes (c-axes) of the CoPt-based perpendicular magnetic recording layer having the hcp crystal structure to be oriented in the perpendicular direction. As the nonmagnetic underlayer made of the Ti-based alloy, there can be cited, other than Ti, a TiCr-based alloy, a TiCo-based alloy, or the like. The thickness of such a nonmagnetic underlayer is preferably 2 nm to 30 nm. When the thickness of the underlayer is less than 2 nm, the control of the crystal axes of the perpendicular magnetic recording layer is insufficient, while, when it exceeds 30 nm, the size of the magnetic crystal grains forming the perpendicular magnetic recording layer is enlarged to increase the noise, which is thus not preferable.

In this invention, when magnetic field annealing is necessary for controlling magnetic domains of the soft magnetic layer, the substrate is preferably made of a glass. Since the glass substrate is excellent in heat resistance, the heating temperature of the substrate can be set high. As the glass for the substrate, there can be cited an aluminosilicate glass, an aluminoborosilicate glass, a soda lime glass, or the like. Among them, the aluminosilicate glass is preferable. Further, an amorphous glass or a crystallized glass can be used. When the soft magnetic layer is amorphous, the substrate is preferably made of the amorphous glass. When a chemically strengthened glass is used, the rigidity is high, which is thus preferable. In this invention, the surface roughness of the main surface of the substrate is preferably 6 nm or less in Rmax and 0.6 nm or less in Ra. By providing such a smooth surface, a gap between perpendicular magnetic recording layer—soft magnetic layer can be set constant so that it is possible to form a suitable magnetic circuit between magnetic head—perpendicular magnetic recording layer—soft magnetic layer.

In this invention, it is also preferable to form an adhesion layer between the substrate and the soft magnetic layer. By forming the adhesion layer, the adhesion between the substrate and the soft magnetic layer can be improved and, therefore, it is possible to prevent stripping of the soft magnetic layer. As a material of the adhesion layer, use can be made of, for example, a Ti-containing material. In terms of practical use, the thickness of the adhesion layer is preferably set to 1 nm to 50 nm. In the perpendicular magnetic recording disk of this invention, it is preferable to provide a protective layer on the perpendicular magnetic recording layer. By providing the protective layer, it is possible to protect the surface of the magnetic disk from the magnetic recording head flying over the magnetic disk. As a material of the protective layer, for example, a carbon-based protective layer is preferable. The thickness of the protective layer is preferably about 3 nm to 7 nm.

It is preferable to further provide a lubricating layer on the protective layer. By providing the lubricating layer, abrasion between the magnetic head and the magnetic disk can be suppressed so that the durability of the magnetic disk can be improved. As a material of the lubricating layer, for example, PFPE (perfluoropolyether) is preferable. The thickness of the lubricating layer is preferably about 0.5 nm to 1.5 nm. It is preferable that the soft magnetic layer, the underlayer, the adhesion layer, and the protective layer be also formed by the sputtering method. Particularly, the DC magnetron sputtering method is preferable because uniform film formation is enabled. It is also preferable to use the in-line type film forming method. Further, the lubricating layer is preferably formed, for example, by the dip coating method.

Effect of the Invention

According to this invention, it is possible to provide a perpendicular magnetic recording disk that can contribute to increasing the recording density by improving the S/N ratio in high density recording without causing an increase in DC noise, degradation in thermal stability, and degradation in recording capability, and a method of manufacturing such a disk.

BEST MODE FOR CARRYING OUT THE INVENTION

FIG. 1 shows one embodiment of a perpendicular magnetic recording disk according to this invention. According to FIG. 1, the embodiment of the perpendicular magnetic recording disk 10 of this invention has a structure in which an adhesion layer 2, a soft magnetic layer 3, a first underlayer 4a, a second underlayer 4b, a ferromagnetic layer 5, a spacer layer 6, a stacked layer 7, a carbon-based protective layer 8, and a lubricating layer 9 are provided on a glass substrate 1 in the order named. Hereinbelow, this invention will be described in detail by giving examples and comparative examples.

EXAMPLE 1

An amorphous aluminosilicate glass was molded into a disk shape by direct press, thereby producing a glass disk. This glass disk was ground, polished, and chemically strengthened in order, thereby obtaining a smooth nonmagnetic glass substrate 1 in the form of a chemically strengthened glass disk. The disk diameter was 65 mm. The surface roughness of the main surface of the glass substrate 1 was measured by an AFM (atomic force microscope) and it was a smooth surface shape with Rmax being 4.8 nm and Ra being 0.42 nm. Rmax and Ra follow Japanese Industrial Standard (JIS). Then, by the use of an evacuated film forming apparatus, an adhesion layer 2 and a soft magnetic layer 3 were formed in order on the obtained glass substrate 1 in an Ar atmosphere according to the DC magnetron sputtering method. In this event, the adhesion layer 2 was formed by the use of a Ti target so as to be a Ti layer having a thickness of 20 nm. On the other hand, the soft magnetic layer 3 was formed by the use of a CoTaZr target so as to be an amorphous CoTaZr (Co:88 at %, Ta:7.0 at %, Zr:4.9 at %) layer having a thickness of 200 nm.

The substrate for a perpendicular magnetic recording disk thus finished with the film formation up to the soft magnetic layer 3 was removed from the film forming apparatus. The surface roughness of the obtained perpendicular magnetic recording disk substrate finished with the film formation up to the soft magnetic layer 3 was measured by the AFM in the same manner and it was a smooth surface shape with Rmax being 5.1 nm and Ra being 0.48 nm. Further, the magnetic properties of the substrate were measured by a VSM (Vibrating Sample Magnetometer). As a result, the coercive force (Hc) was 2 Oe and the saturation magnetic flux density was 810 emu/cc, thus showing suitable soft magnetic properties. Since underlayers and a perpendicular magnetic recording layer are formed on the soft magnetic layer 3 having the smooth surface shape with Rmax being 5.5 nm or less and/or Ra being 0.5 nm or less, it is suitable for reducing noise. Then, by the use of an evacuated single-wafer stationary facing type film forming apparatus, a first underlayer 4a, a second underlayer 4b, a ferromagnetic layer 5, a spacer layer 6, a stacked layer 7, and a carbon-based protective layer 8 were formed in order on the obtained substrate in an Ar atmosphere according to the DC magnetron sputtering method.

On the substrate finished with the film formation up to the soft magnetic layer 3, at first, the first underlayer 4a made of amorphous NiTa (Ni:45 at %, Ta:55 at %) and having a thickness of 10 nm and the second underlayer 4b made of Ru and having a thickness of 30 nm were formed. Herein, two layers each made of Ru may be formed instead. That is, by forming the upper-layer side Ru at a gas pressure of the Ar gas higher than that used when forming the lower-layer side Ru, the crystal orientation can be improved.

Then, by the use of a hard magnetic target made of Co Cr Pt and $SiO_2$, the ferromagnetic layer 5 having a hcp crystal structure was formed to a thickness of 15 nm. The composition of the target for forming the ferromagnetic layer 5 was Co:62 at %, Cr:10 at %, Pt:16 at %, $SiO_2$:12 at %. The ferromagnetic layer 5 was formed at a gas pressure of 30 mTorr. Then, the spacer layer 6 made of Pd and having a thickness of 0.9 nm was formed. Further, the stacked layer 7 in the form of alternate-layered films of CoB and Pd was formed. CoB was first formed into a film of 0.3 nm and, thereon, Pd was formed into a film of 0.9 nm. Accordingly, the total thickness of the stacked layer 6 was 1.2 nm. The stacked layer 7 was formed at a gas pressure of 10 mTorr lower than that used when forming the ferromagnetic layer 5.

Then, by the use of a mixed gas containing 18 vol % hydrogen in Ar and by sputtering a carbon target, the carbon-based protective layer 8 made of hydrogenated carbon was formed. The thickness of the carbon-based protective layer 8 was 4.5 nm. Since the film hardness is improved in the form of hydrogenated carbon, it is possible to protect the perpendicular magnetic recording layer against an impact from a magnetic head. Thereafter, a lubricating layer 9 made of PFPE (perfluoropolyether) was formed by the dip coating method. The thickness of the lubricating layer 9 was 1 nm. Through the manufacturing process as described above, the perpendicular magnetic recording disk of this example was obtained. The surface roughness of the obtained perpendicular magnetic recording disk was measured by the AFM in the same manner and it was a smooth surface shape with Rmax being 4.53 nm and Ra being 0.40 nm. By forming the spacer layer 6 and the stacked layer 7, the surface roughness Rmax and Ra are improved. The surface roughness is further improved by increasing the number of cycles of CoB and Pd of the stacked layer 7. This also provides a new effect that glide characteristics and flying characteristics are improved so that the thickness of the protective layer can be reduced.

The orientation of the perpendicular magnetic recording layer (the ferromagnetic layer 5, the spacer layer 6, and the stacked layer 7 will be collectively called the perpendicular magnetic recording layer and the same shall apply hereinafter) in the obtained perpendicular magnetic recording disk was analyzed by the X-ray diffraction method and the c-axis of the hcp (hexagonal close-packed) crystal structure was oriented in a direction perpendicular to the disk surface. Further, the ferromagnetic layer 5 in the obtained perpendicular magnetic recording disk was analyzed in detail by the use of a transmission electron microscope (TEM) and it had a granular structure. Specifically, it was confirmed that grain boundary portions made of Si oxide were formed between crystal grains of the hcp crystal structure containing Co. It was found from this analysis that the ferromagnetic layer 5 was made of the magnetic grains of about 6 nm and the boundary regions made of the nonmagnetic bodies of about 2 nm. On the other hand, the stacked layer 7 being the layer above the ferromagnetic layer 5 having the granular structure was analyzed in detail by the use of the TEM and it did not have a granular structure. This represents that the stacked layer 7 has a structure being substantially continuous magnetically. That is, this represents that the magnetic grains of the ferromagnetic layer 5 of the granular structure are magnetically coupled through the stacked layer 7. It is considered that this improves the thermal stability.

EXAMPLE 2

A perpendicular magnetic recording disk was obtained in the same manner as in Example 1 except that the stacked layer 7 in Example 1 was changed to alternate-layered films of two cycles of CoB and Pd (Example 2). The total thickness of the stacked layer 7 in the perpendicular magnetic recording disk of this example was 2.4 nm. The orientation of a perpendicular magnetic recording layer in the obtained perpendicular magnetic recording disk was analyzed by the X-ray diffraction method and, like in Example 1, the c-axis of a hcp (hexagonal close-packed) crystal structure was oriented in a direction perpendicular to the disk surface. Further, a ferromagnetic layer 5 in the obtained perpendicular magnetic recording disk was analyzed in detail by the use of the transmission electron microscope (TEM) and it had a granular structure like in Example 1. Specifically, it was confirmed that grain boundary portions made of Si oxide were formed between crystal grains of the hcp crystal structure containing Co.

EXAMPLE 3

A perpendicular magnetic recording disk was obtained in the same manner as in Example 1 except that the stacked layer 7 in Example 1 was changed to alternate-layered films of five cycles of CoB and Pd (Example 3). The total thickness of the stacked layer 7 in the perpendicular magnetic recording disk of this example was 6.0 nm. The orientation of a perpendicular magnetic recording layer in the obtained perpendicular magnetic recording disk was analyzed by the X-ray diffraction method and, like in Example 1, the c-axis of a hcp (hexagonal close-packed) crystal structure was oriented in a direction perpendicular to the disk surface. Further, a ferromagnetic layer 5 in the obtained perpendicular magnetic recording disk was analyzed in detail by the use of the transmission electron microscope (TEM) and it had a granular structure like in Example 1. Specifically, it was confirmed that grain boundary portions made of Si oxide were formed between crystal grains of the hcp crystal structure containing Co.

COMPARATIVE EXAMPLE 1

In Example 1, by the use of a hard magnetic target made of CoCrPt and $SiO_2$ (Co:62 at %, Cr:10 at %, Pt: 16 at %, $SiO_2$:12 at %), a ferromagnetic layer 5 was formed to a thickness of 15 nm. Then, on this ferromagnetic layer 5, a carbon-based protective layer 8 and a lubricating layer 9 were formed without forming a spacer layer 6 and a stacked layer 7. Except this point, a perpendicular magnetic recording disk was obtained in the same manner as in Example 1. The surface roughness of the obtained perpendicular magnetic recording disk was measured by the AFM and it was a surface shape with Rmax being 6.26 nm and Ra being 0.48 nm. This is rougher as compared with the foregoing perpendicular magnetic recording disk formed with the spacer layer 6 and the stacked layer 7. Further, the orientation of the ferromagnetic layer 5 in the obtained perpendicular magnetic recording disk was analyzed by the X-ray diffraction method and the c-axis of a hcp (hexagonal close-packed) crystal structure was oriented in a direction perpendicular to the disk surface. Further, the ferromagnetic layer 5 in the obtained perpendicular magnetic recording disk was analyzed in detail by the use of the transmission electron microscope (TEM) and it had a granular structure. Specifically, it was confirmed that grain boundary portions made of Si oxide were formed between crystal grains of the hcp crystal structure containing Co.

COMPARATIVE EXAMPLE 2

In Example 1, by the use of a hard magnetic target made of CoCrPt (Co:70 at %, Cr:18 at %, Pt:12 at %), a ferromagnetic layer 5 was formed to a thickness of 15 nm. Except this point, a perpendicular magnetic recording disk was obtained in the same manner as in Example 1. The orientation of a perpendicular magnetic recording layer in the obtained perpendicular magnetic recording disk was analyzed by the X-ray diffraction method and the c-axis of a hcp (hexagonal close-packed) crystal structure was oriented in a direction perpendicular to the disk surface.

The static magnetic properties of the obtained perpendicular magnetic recording disks of the examples and comparative examples were evaluated by the use of the VSM and a polar Kerr loop tracer. FIG. 3 shows MH curves measured by the VSM, wherein the thickness of the stacked layer was changed by increasing n in the multilayer film [CoB/Pd]n. Therefore, n=1 (Example 1), n=2 (Example 2), n=5 (Example 3), and n=0 (Comparative Example 1). On the other hand, FIG. 2 shows a magnetization reversal nucleus producing magnetic field (Hn) and a saturation magnetic field (Hs) in an MH curve. That is, the magnetization reversal nucleus producing magnetic field (Hn) is a numerical value at a point on the axis of abscissas corresponding to a point of intersection between a tangent of a line showing saturation magnetization and a tangent of an oblique line. On the other hand, the saturation magnetic field (Hs) is a numerical value at a point on the axis of abscissas corresponding to a point of intersection of a hysteresis loop. From FIG. 3, it is understood that the magnetization reversal nucleus producing magnetic field (Hn) increases while the saturation magnetic field (Hs) decreases due to the increase in thickness of the stacked layer. This represents that the thermal stability is improved and, simultaneously, recording is facilitated by forming the perpendicular magnetic recording layer to have the layered structure of the ferromagnetic layer 5, the spacer layer 6, and the stacked layer 7. Note that Hn decreases at n=5, which is considered to be due to reduction in Hc. Table 1 below collectively shows the evaluation results of static magnetic properties and electromagnetic conversion properties of the perpendicular magnetic recording disks of the respective examples and comparative examples. Note that Table 1 shows absolute values of Hn values (minus values) that appear when applying an external magnetic field from a plus saturation magnetic field to a minus direction.

TABLE 1

| Table 1 | Hc (Oe) | Mr/Ms | Hn (Oe) | O/W (dB) | S/N(DC) (dB) | S/N(MF) (dB) |
|---|---|---|---|---|---|---|
| Example 1 | 3900 | 1.000 | 200 | 29.5 | 26.0 | 22.0 |
| Example 2 | 4010 | 1.000 | 1740 | 34.6 | 28.1 | 22.2 |
| Example 3 | 3780 | 1.000 | 1600 | 49.3 | 32.0 | 23.5 |
| Comparative Example 1 | 2900 | 1.000 | 500 | 28.0 | 25.0 | 15.0 |
| Comparative Example 2 | 3882 | 0.989 | 100 | 27.4 | 24.2 | 21.5 |

It is understood from Table 1 that, according to the perpendicular magnetic recording disks of the examples of this invention, the magnetization reversal nucleus producing magnetic field (Hn) measured by the polar Kerr loop tracer increases by about 100 to 1600 oersteds (Oe) as compared with the conventional type perpendicular magnetic recording disk as shown in Patent Document 2 wherein, like Comparative Example 2, the perpendicular magnetic recording layer has the layered structure of the ferromagnetic layer 5, the spacer layer 6, and the stacked layer 7 but the magnetic recording layer does not contain Si or Si oxide. Further, according to the measurement of the electromagnetic conversion properties, the overwrite properties (O/W) are largely improved by 1.5 to 2.1 dB in Example 1, 6.6 to 7.2 dB in Example 2, and 21.3 to 21.9 dB in Example 3 as compared with Comparative Examples 1 and 2. Further, S/N(DC) is largely improved by 1.0 to 1.8 dB in Example 1, 3.1 to 3.9 dB in Example 2, and 7.0 to 7.8 dB in Example 3 as compared with Comparative Examples 1 and 2. Further, S/N(MF) is improved by 0.5 dB in Example 1, 0.7 dB in Example 2, and 2.0 dB in Example 3 as compared with Comparative Example 2 and improved by 7.0 dB in Example 1, 7.2 dB in Example 2, and 8.5 dB in Example 3 as compared with Comparative Example 1. Moreover, as a result of measuring error rates under the conditions where a recording density of 100 Gbit/inch$^2$ can be achieved, an improvement by about one to two digits was obtained. This value represents that this invention can achieve a recording density about two to three times larger than that of the conventional type mediums like Comparative Examples 1 and 2.

The electromagnetic conversion properties were measured in the following manner.

The measurement was carried out by the use of a R/W analyzer (DECO) and a magnetic head for a perpendicular magnetic recording system having a SPT element on the recording side and a GMR element on the reproducing side. In this event, the flying height of the magnetic head was 10 nm.

Measurement methods of S/N(DC), S/N(MF), and overwrite property (O/W) were as follows.

Given that a maximum recording density (1F) was 960 kfci, S/N(DC) and S/N(MF) were measured as S/N ratios. S/N(DC) was calculated by recording a carrier signal on the perpendicular magnetic recording medium at 24F recording density (40 kfci) and then observing medium noise from a DC frequency range to a frequency range 1.2 times 1F by the use of a spectrum analyzer. S/N(MF) was calculated by recording a carrier signal on the perpendicular magnetic recording medium at 2F recording density (480 kfci) and then observing medium noise from the DC frequency range to the frequency range 1.2 times 1F by the use of the spectrum analyzer. Further, the overwrite property was derived by recording a carrier signal on the perpendicular magnetic recording medium at 24F (40 kfci) recording density, then overwriting a carrier at 1F recording density (960 kfci), and then measuring a carrier reproduction output at the original 24F (40 kfci) recording density and a remaining reproduction output of a 12F carrier after the 1F overwriting.

Then, the thermal stability was evaluated with respect to Example 3 (the medium having the alternate-layered films of five cycles of CoB and Pd as the stacked layer 7) and Comparative Example 1 (the medium without the spacer layer 6 and the stacked layer 7). The evaluation of the thermal stability was carried out by recording a signal on the magnetic disk and then confirming a reproduction output after the lapse of a predetermined time. Accordingly, the thermal stability was evaluated by measuring the decay rate of the signal with the lapse of time.

FIG. 4 is a diagram showing a relationship between an elapsed time and a ratio to a reproduction output immediately after recording, wherein the results of Example 3 according to this invention are plotted by □ and the results of Comparative Example 1 are plotted by ●. As shown in FIG. 4, it is understood that the reproduction output weakens as the time elapses in the case of the magnetic disk of Comparative Example 1 being the medium without the spacer layer 6 and the stacked layer 7. On the other hand, it is understood that the reproduction output hardly weakens and thus the thermal stability is excellent in the case of the magnetic disk of Example 3 according to this invention.

Then, ΔHc was measured in order to examine as to what caused the improvement in SN as described above. ΔHc is a difference between a value of H at a half position of saturation magnetization Ms in a minor loop and a value of H at a half position of saturation magnetization Ms in a hysteresis curve.

A value standardized by Hc is used as an index for observing dispersion of coercive force of magnetic grains. By the use of the value of ΔHc/Hc, it is possible to evaluate virtual grain uniformity and magnetic uniformity. Herein, the minor loop represents a curve describing a minor loop by causing a magnetic field to be zero before saturation. In FIG. 5, (a) and FIG. 5, (b), average lines are adopted from among curves repeatedly described a plurality of times.

FIG. 5, (a) and FIG. 5, (b) respectively describe minor loops and hysteresis curves of the magnetic disk according to Comparative Example 1 and the magnetic disk according to Example 3 of this invention. ΔHc/Hc was observed with respect to Comparative Example 1 shown in FIG. 5, (a) and it was 0.26. On the other hand, ΔHc/Hc with respect to Example 3 shown in FIG. 5, (b) was reduced to 0.15 and it has been found that the dispersion of coercive force of the magnetic grains can be reduced by forming the spacer layer 6 and the stacked layer 7. It is considered that this caused the SN to be excellent.

Figure 1:
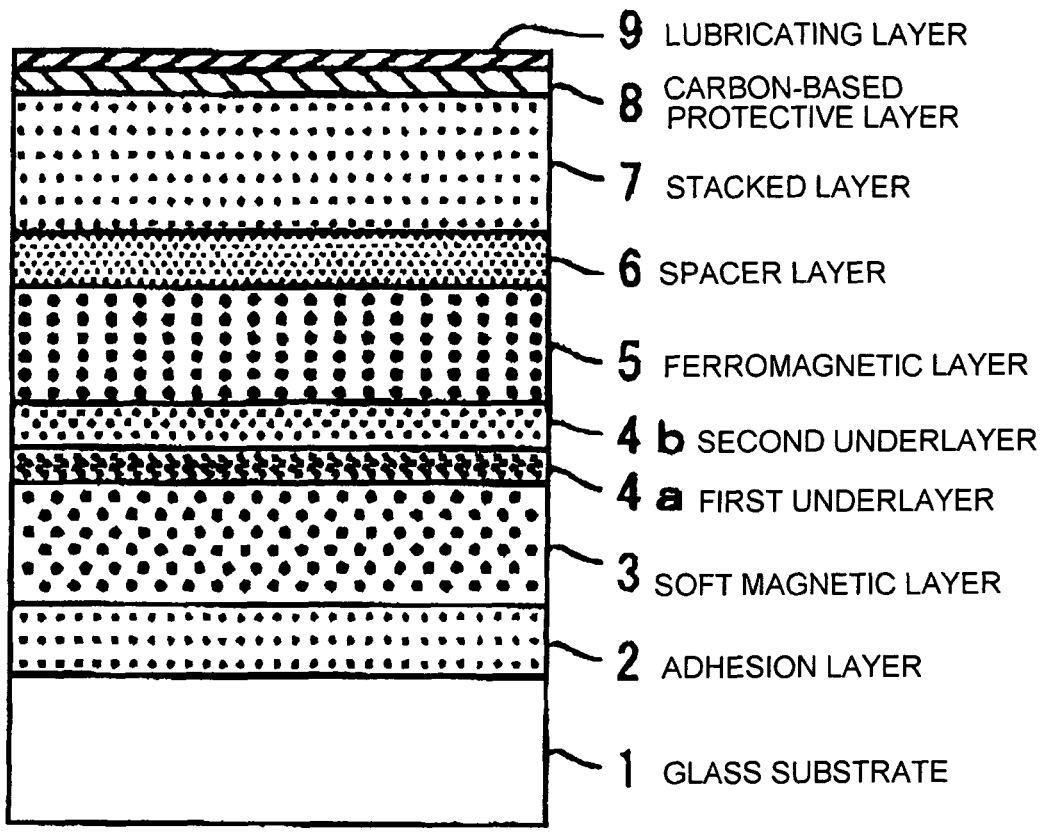
[FIG. 1] is an exemplary sectional view of a perpendicular magnetic recording disk according to one embodiment of this invention.
Figure 2:
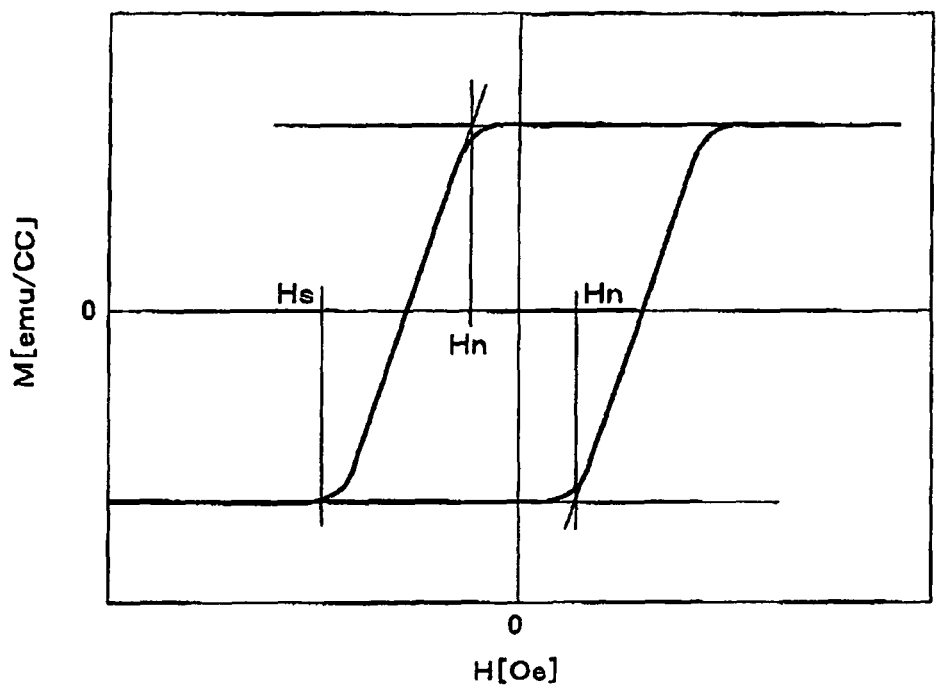
[FIG. 2] is a diagram showing a magnetization reversal nucleus producing magnetic field (Hn) and a saturation magnetic field (Hs) in an MH curve.
Figure 3:
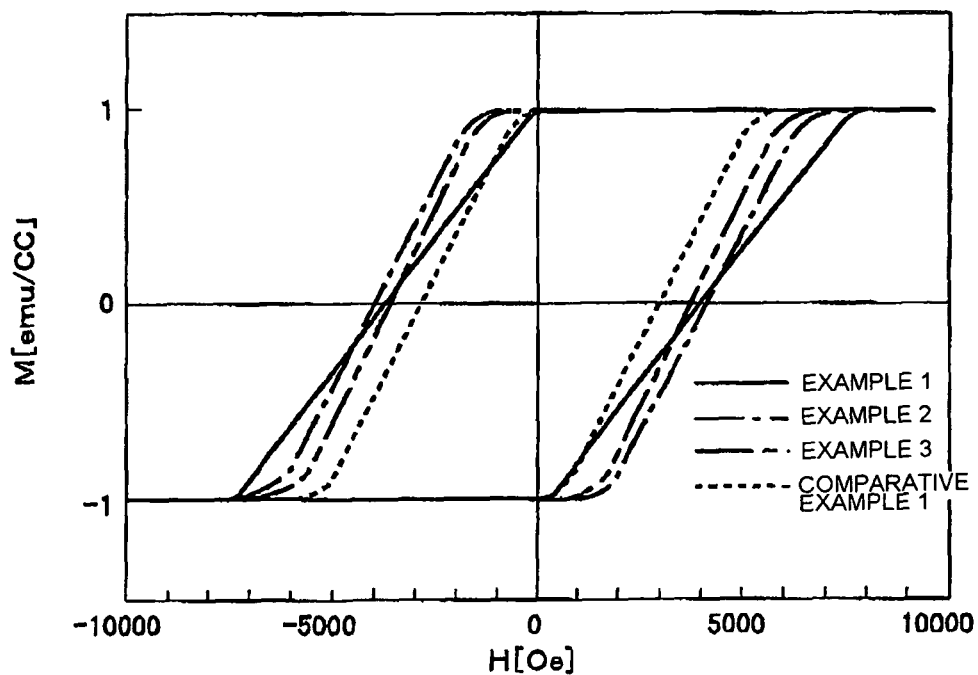
[FIG. 3] is a diagram of MH curves in examples and a comparative example.
Figure 4:
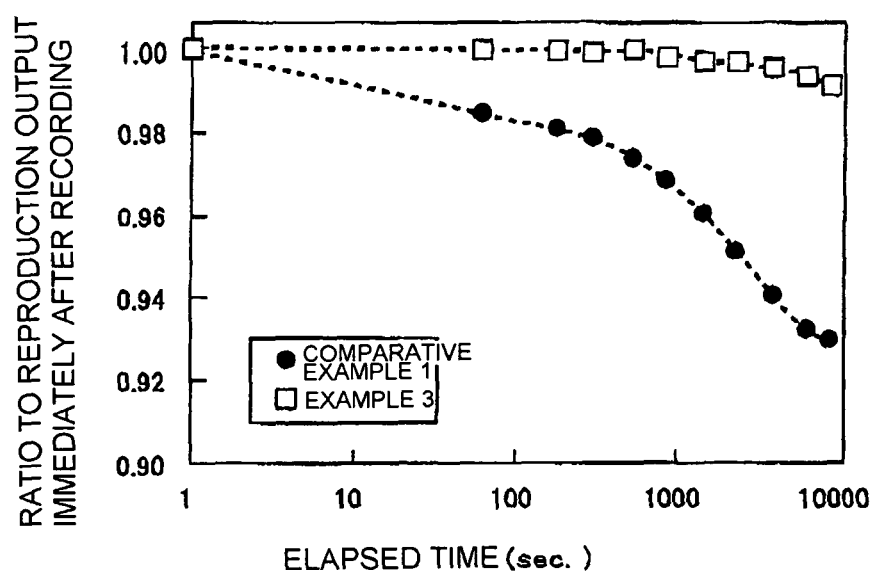
[FIG. 4] is a diagram showing a relationship between an elapsed time and a ratio to a reproduction output immediately after recording.
Figure 5:
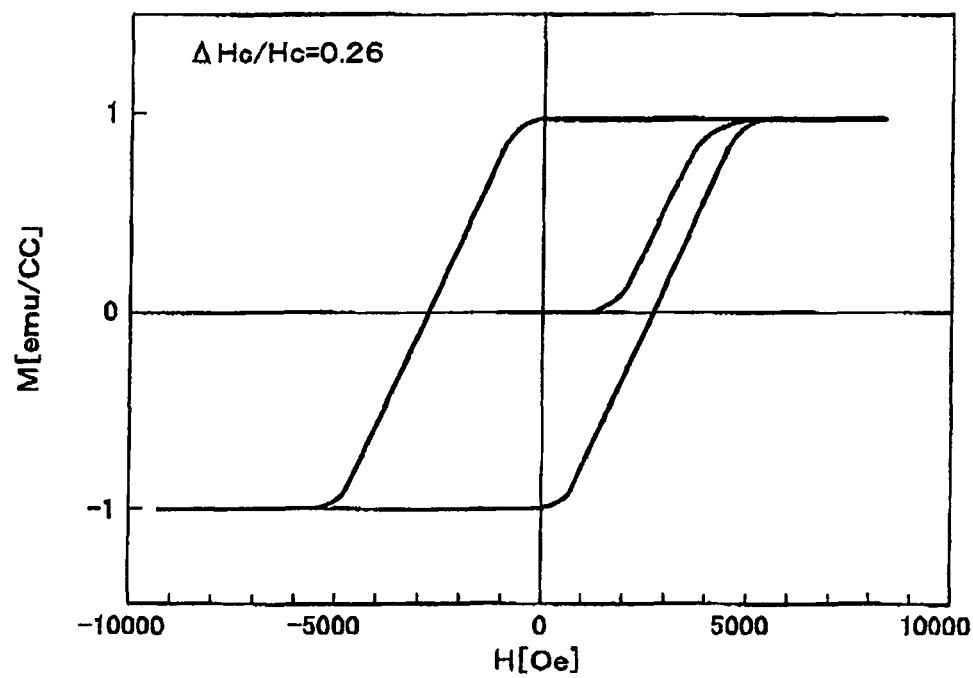
[FIG. 5] is diagrams describing minor loops and hysteresis curves of a magnetic disk of a comparative example and a magnetic disk according to this invention.
Figure 5:
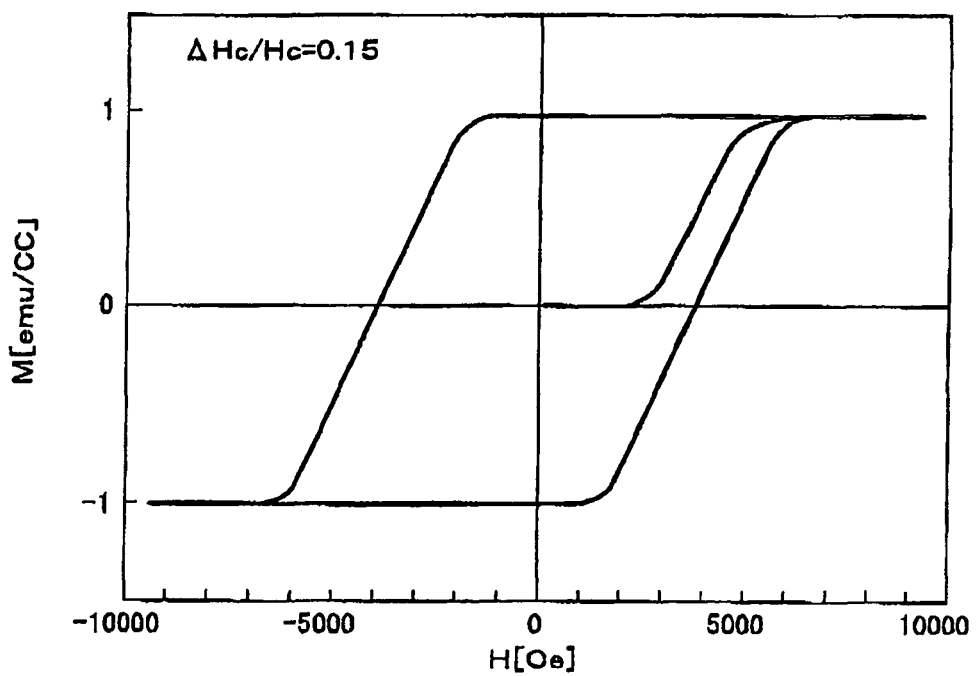
Figure 6:
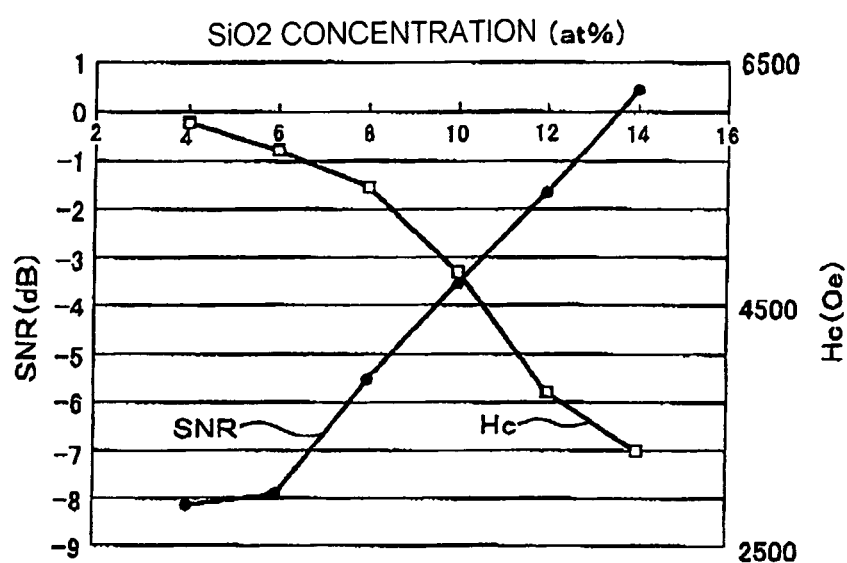
[FIG. 6] is a diagram showing a relationship between a coercive force Hc and a SNR when increasing the amount of $SiO_2$.

DESCRIPTION OF SYMBOLS 1 glass substrate
2 adhesion layer
3 soft magnetic layer
4a first underlayer
4b second underlayer
5 ferromagnetic layer
6 spacer layer
7 stacked layer
8 carbon-based protective layer
9 lubricating layer
10 perpendicular magnetic recording disk

The invention claimed is:

1. A perpendicular magnetic recording disk for use in perpendicular magnetic recording, said perpendicular magnetic recording disk characterized by comprising a substrate, a soft magnetic layer of a material selected from a group consisting of an Fe-based material and a Co-based material on said substrate, and a magnetic recording layer on said soft magnetic layer, wherein said magnetic recording layer comprises a ferromagnetic layer on said soft magnetic layer, having a granular structure, and comprising crystal grains mainly made of cobalt (Co) and grain boundary portions mainly made of $SiO_2$, a spacer layer selected from a group consisting of a Pd layer and a Pt layer on said ferromagnetic layer, and a layer, on said spacer layer, having no granular structure and comprising alternating films of Co or an alloy thereof and Pd or alternating films of Co or an alloy thereof and Pt, the content of the $SiO_2$ in said ferromagnetic layer being 8 at% to 15 at%, said perpendicular magnetic recording disk comprising, on said substrate, said soft magnetic layer, said ferromagnetic layer having the granular structure, said spacer layer, and said layer having no granular structure in this order; wherein the layer having no granular structure comprises at least two films of Co or an alloy thereof and at least two films of Pd or Pt.

2. A perpendicular magnetic recording disk according to claim 1, further comprising an underlayer including Ru provided between said soft magnetic layer and said ferromagnetic layer.

3. The perpendicular magnetic recording disk according to claim 1, wherein the content of the $SiO_2$ in said ferromagnetic layer is 10 at% to 15 at%.

4. The perpendicular magnetic recording disk according to claim 1, wherein the content of the $SiO_2$ in said ferromagnetic layer is 12 at%.

5. The perpendicular magnetic recording disk according to claim 4, wherein the layer having no granular structure comprises five films of Co or an alloy thereof and five films of Pd or Pt.

6. A method of manufacturing a perpendicular magnetic recording disk for use in perpendicular magnetic recording and having at least a soft magnetic layer of a material selected from a group consisting of an Fe-based material and a Co-based material on a substrate and a magnetic recording layer on said soft magnetic layer, said method characterized by, in a step of forming said magnetic recording layer comprising, on said soft magnetic layer, a ferromagnetic layer of a granular structure comprising $SiO_2$ between crystal grains comprising cobalt (Co), the content of the $SiO_2$ in said ferromagnetic layer being 8 at% to 15 at%, a spacer layer selected from a group consisting of a Pd layer and a Pt layer on said ferromagnetic layer, and a layer, on said spacer layer, having no granular structure and comprising alternating films of Co or an alloy thereof and Pd or alternating films of Co or an alloy thereof and Pt, forming said ferromagnetic layer on said soft magnetic layer by sputtering in an argon gas atmosphere and then forming said layer having no granular structure by sputtering in an argon gas atmosphere at a gas pressure lower than a gas pressure used when forming said ferromagnetic layer, said method thereby manufacturing said perpendicular magnetic recording disk comprising, on said substrate, said soft magnetic layer, said ferromagnetic layer having the granular structure, said spacer layer, and said layer having no granular structure in this order, wherein the layer having no granular structure comprises at least two films of Co or an alloy thereof and at least two films of Pd or Pt.

7. The method of manufacturing a perpendicular magnetic recording disk according to claim 6, wherein the content of the $SiO_2$ in said ferromagnetic layer is 10 at% to 15 at%.

8. The method of manufacturing a perpendicular magnetic recording disk according to claim 6, wherein the content of the $SiO_2$ in said ferromagnetic layer is 12 at%.

9. The method of manufacturing a perpendicular magnetic recording disk according to claim 8, wherein the layer having no granular structure comprises five films of Co or an alloy thereof and five films of Pd or Pt.

10. A method of manufacturing a perpendicular magnetic recording disk for use in perpendicular magnetic recording and having at least a soft magnetic layer of a material selected from a group consisting of an Fe-based material and a Co-based material on a substrate, an underlayer including Ru on said soft magnetic layer, and a magnetic recording layer on said underlayer, said method characterized by, in a step of forming said magnetic recording layer comprising, on said underlayer, a ferromagnetic layer of a granular structure comprising $SiO_2$ between crystal grains comprising cobalt (Co), the content of the $SiO_2$ in said ferromagnetic layer being 8 at% to 15 at%, a spacer layer selected from a group consisting of a Pd layer and a Pt layer on said ferromagnetic layer, and a layer, on said spacer layer, having no granular structure and comprising alternating films of Co or an alloy thereof and Pd or alternating films of Co or an alloy thereof and Pt, forming said ferromagnetic layer on said underlayer by sputtering in an argon gas atmosphere and then forming said layer having no granular structure by sputtering in an argon gas atmosphere at a gas pressure lower than a gas pressure used when forming said ferromagnetic layer, said method thereby manufacturing said perpendicular magnetic recording disk comprising, on said substrate, said soft magnetic layer, said underlayer, said ferromagnetic layer having the granular structure, said spacer layer, and said layer having no granular structure in this order, wherein the layer having no granular structure comprises at least two films of Co or an alloy thereof and at least two films of Pd or Pt.

* * * * *